US008060835B2

(12) United States Patent
Newcomer et al.

(10) Patent No.: US 8,060,835 B2
(45) Date of Patent: Nov. 15, 2011

(54) THREE DIMENSIONAL DEFECT MAPPING

(75) Inventors: Ronald Jerry Newcomer, Ballwin, MO (US); Robert Martin Trn, Fenton, MO (US); John Robert Dworschak, Wildwood, MO (US); Michael Timothy Rusert, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 1040 days.

(21) Appl. No.: 11/758,276

(22) Filed: Jun. 5, 2007

(65) Prior Publication Data

US 2008/0307327 A1    Dec. 11, 2008

(51) Int. Cl.
*G06F 3/048* (2006.01)
(52) U.S. Cl. .................. 715/782; 382/149; 382/152
(58) Field of Classification Search .................. 715/782; 382/149, 152
See application file for complete search history.

(56) References Cited

U.S. PATENT DOCUMENTS

| | | | | |
|---|---|---|---|---|
| 5,956,664 | A * | 9/1999 | Bryan | 702/184 |
| 6,292,582 | B1 * | 9/2001 | Lin et al. | 382/149 |
| 6,327,921 | B1 * | 12/2001 | Hsu et al. | 73/866.5 |
| 6,522,993 | B1 * | 2/2003 | Tomko | 702/150 |
| 7,076,532 | B2 * | 7/2006 | Craik | 709/217 |
| 7,155,369 | B2 * | 12/2006 | Papadimitriou et al. | 702/185 |
| 7,187,436 | B2 * | 3/2007 | Harding et al. | 356/237.2 |
| 7,272,254 | B2 * | 9/2007 | Shankarappa et al. | 382/149 |
| 7,599,054 | B2 * | 10/2009 | Takeda et al. | 356/237.5 |
| 2004/0210586 | A1 * | 10/2004 | Birdwell et al. | 707/100 |
| 2005/0008215 | A1 * | 1/2005 | Shepard | 382/141 |
| 2005/0031158 | A1 * | 2/2005 | Biernacki et al. | 382/100 |
| 2005/0128472 | A1 * | 6/2005 | Shibata et al. | 356/237.3 |
| 2006/0288756 | A1 * | 12/2006 | De Meurechy | 73/1.01 |
| 2007/0217672 | A1 * | 9/2007 | Shannon et al. | 382/152 |
| 2008/0126945 | A1 * | 5/2008 | Munkvold et al. | 715/733 |
| 2008/0177411 | A1 * | 7/2008 | Marsh et al. | 700/110 |
| 2008/0247636 | A1 * | 10/2008 | Davis et al. | 382/152 |

FOREIGN PATENT DOCUMENTS

| | | |
|---|---|---|
| EP | 1496474 A1 | 1/2005 |
| GB | 2285129 A * | 6/1995 |
| WO | 2008091714 A1 | 7/2008 |

OTHER PUBLICATIONS

Ibrahim Elshafiey and Lalita Udpa "A new Eddy current imaging system for enhancement of nondestructive evaluation" $2^{nd}$ MENDT Prooceedings, Sep. 2004 vol. 9 No. 9.*

(Continued)

*Primary Examiner* — William Bashore
*Assistant Examiner* — Gregory A Distefano
(74) *Attorney, Agent, or Firm* — Yee & Associates, P.C.

(57) ABSTRACT

A computer implemented method, apparatus, and computer usable program code for a three dimensional presentation of defects in a system. In response to a request to present a set of defects using a three dimensional presentation, information is retrieved for the set of defects from a database, wherein the information includes an identification of a defect and a location of the defect in the system. A three dimensional model of the system is retrieved in which the defects are located. The defects are placed in the three dimensional model of the system to generate a modified three dimensional model. The modified three dimensional model is presented on a graphical user interface.

20 Claims, 7 Drawing Sheets

OTHER PUBLICATIONS

W. Deng, B. J. Matuszewski, L. K. Shark, J. P. Smith and G. Cavaccini "Multi-modality NDT image fusion and its mapping on curved 3D CAD surface," Proc. 16th World Conf. NDT Montreal, QC, Canada, Aug. 2004.*

C. Lehr and C. E. Liedtke, 3d reconstruction of volume defects from few x-ray images, Lecture Notes in Comput. Sci. 1689, Springer-Verlag, London, 1999, pp. 275-284.*

Spatial Integrated Systems, 3DIS, Revolutionary Digital 3D Image and Data Capture System, Model 1500 copyright 2005 2 pages.*

Boeing, I-STAR, Crack/Defect Map, retrieved Jan. 12, 2010, 72 pages. http://phl-web-02.ne.nos.boeing.com/Quality/qa/I-STAR/cracks/crackmap.htm.

Boeing, I-STAR, Fuel Pod, 1 page.

Boeing, I-STAR, Tunnel, 3 pages.

* cited by examiner

THREE DIMENSIONAL DEFECT MAPPING

BACKGROUND INFORMATION

1. Field

The present invention relates generally to an improved data processing system and in particular to a method and apparatus for processing data. Still more particularly, the present invention relates to a computer implemented method, apparatus, and computer usable program code for providing a three dimensional presentation of defects.

2. Background

A defect is a failure of a component or a part of a system to conform to a specification. For example, when a mechanic on the shop floor assembles a part, the part could be dropped or mislocated. Additionally, the part may be attached incorrectly or if a hole is made in the part, the hole may be of the incorrect size. These different situations may result in a particular part or assembly not meeting the specification for the part or assembly. These different incidents are called nonconformances. These nonconformances are also referred to as defects.

Currently, defects or nonconformances are documented by placing a tag at the location of the defect. For example, a tag may be placed in the bay of an aircraft to identify a hole that does not conform to the specifications. After the different defects or nonconformances are identified, an engineer or a team of engineers may work through the different nonconformances that have been marked on the aircraft.

In addition to placing a tag on the aircraft, the nonconformance or defect may be recorded in a database. An entry is typically created containing an identification of the nonconformance, as well as details of the nonconformance.

Currently, these defects may be associated with a two dimensional drawing. An engineer may look at the different nonconformances located on a particular two dimensional drawing and use this mapping of defects to analyze nonconformances. For example, an entry in a database for a nonconformance may have an identifier that matches the tag on the aircraft. Further, the entry also may include an identification of the location of the defect on the aircraft. For example, the entry may state that an oversized hole is present in bay five in the upper shelf.

Later, the engineer or other user that desires to locate the defect using the entry in the database, looks at the engineering definitions to locate the upper shelf in bay five. The entry may be used in conjunction with a two dimensional drawing to help identify the location of the defect. The user may need to look at various two dimensional drawings to find the appropriate drawing.

SUMMARY

The advantageous embodiments of the present invention provide a computer implemented method, apparatus, and computer usable program code for a three dimensional presentation of defects in a system. In response to a request to present a set of defects using a three dimensional presentation, information is retrieved for the set of defects from a database, wherein the information includes an identification of a defect and a location of the defect in the system. A three dimensional model of the system is retrieved in which the defects are located. The defects are placed in the three dimensional model of the system to generate a modified three dimensional model. The modified three dimensional model is presented on a graphical user interface.

In another advantageous embodiment of the present invention, parameters defining a defect are loaded from a database, wherein the parameters include a location of the defect in the system. The defect is displayed in the location within a three dimensional presentation of the system.

In yet another advantageous embodiment of the present invention, a computer program product contains a computer usable program code for a three dimensional presentation of defects in a system. The computer usable program code retrieves information for the set of defects from a database in response to a request to present a set of defects using a three dimensional presentation, wherein the information includes an identification of a defect and a location of the defect in the system. Computer usable program code is present to retrieve a three dimensional model of the system in which the defects are located. Computer usable program code is present to place the defects in the three dimensional model of the system to generate a modified three dimensional model. The computer usable program code presents the modified three dimensional model on a graphical user interface.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
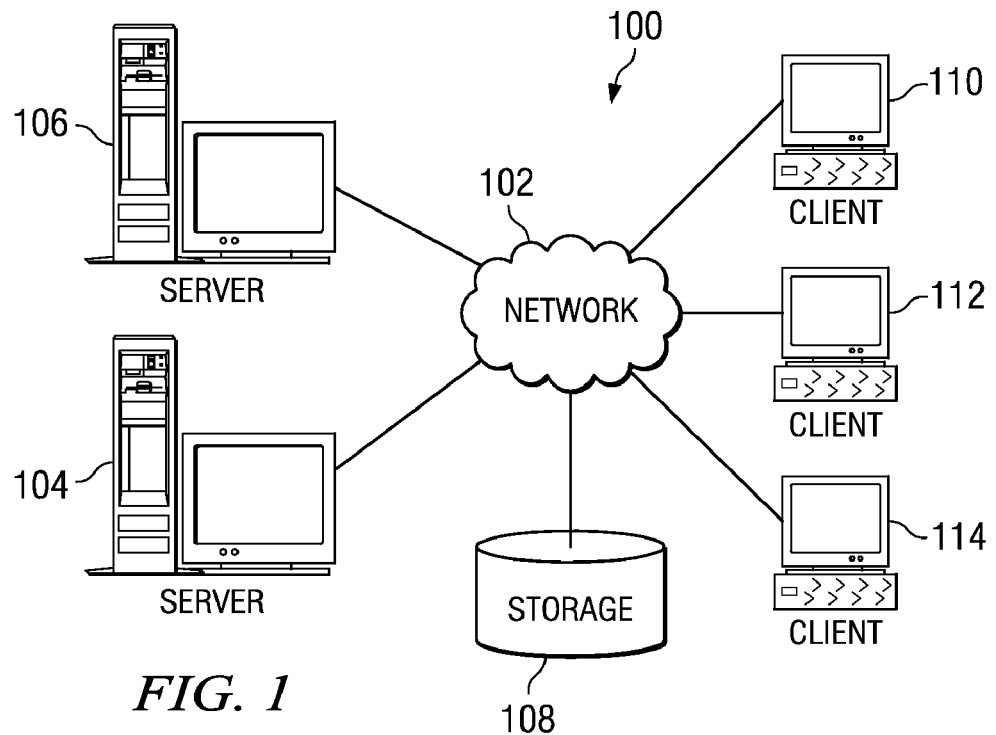
FIG. 1 depicts a pictorial representation of a network of data processing systems in which advantageous embodiments may be implemented.
Figure 2:
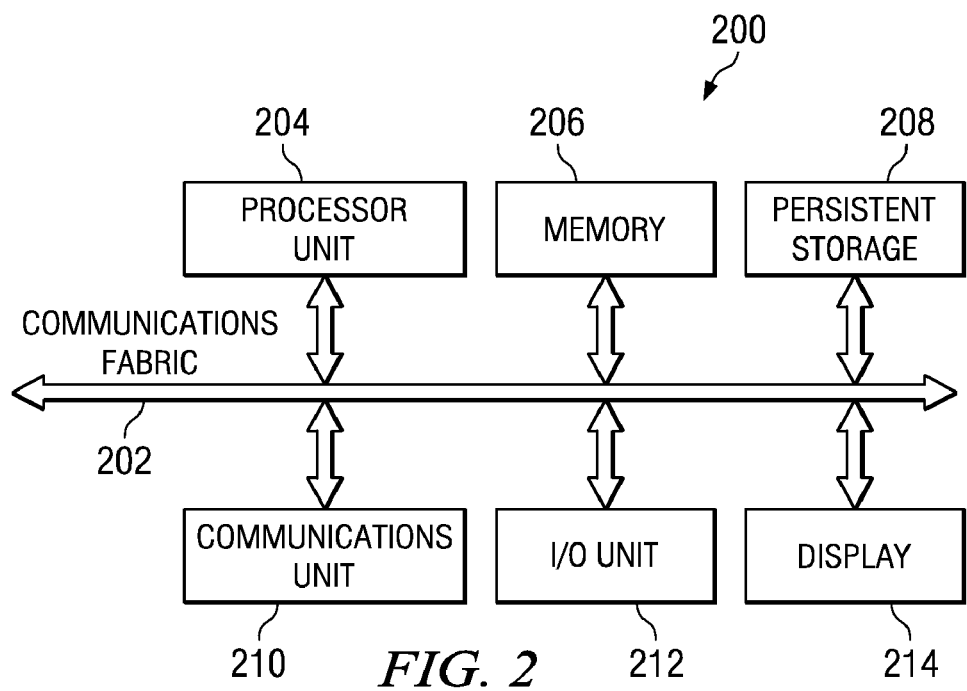
FIG. 2 is a diagram of a data processing system in accordance with an advantageous embodiment of the present invention.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which advantageous embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 for example, may be personal computers or network computers. In the depicted example, server 104 provides data, such as boot files, operating system images, and applications to clients 110, 112, and 114. In this example, clients 110, 112, and 114 are clients to server 104. Also, server 104 may manage a database of defects for various systems. Clients 110, 112, and 114 may be computers used to enter information about defects found in the systems.

In the illustrative embodiments, processes for providing a three dimensional visualization of defects may be implemented at a server, a client, or a combination of the two. The different illustrative embodiments may be implemented in any computer or other device that is capable of presenting three dimensional views of a component or system. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an advantageous embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a re-writable optical disk, a re-writable magnetic tape, or some combination of the above.

The different illustrative embodiments recognize that the current system of corresponding information about defects to two dimensional drawings is time consuming and slows down the completion of products, such as aircraft or ships. For example, a hole that is oversized may go through several parts. In order to identify this defect, the user may have to refer to several drawings because these parts may be located on different two dimensional drawings. This type of process is time consuming and increases the time and costs needed to complete systems, such as aircraft.

Therefore, the advantageous embodiments of the present invention provide a computer implemented method, apparatus, and computer usable program code for providing a three dimensional presentation of defects for a system. The different defects are stored in a database. These defects may be retrieved and the data about the defects are processed and displayed with a three dimensional model of the system. In one illustrative embodiment, the three dimensional display of the defects and a three dimensional model of a system involves creating a three dimensional model of the system and then placing the defects in the three dimensional model of the system. As a result, the defects are displayed in the correct location within the three dimensional model.

Figure 3:
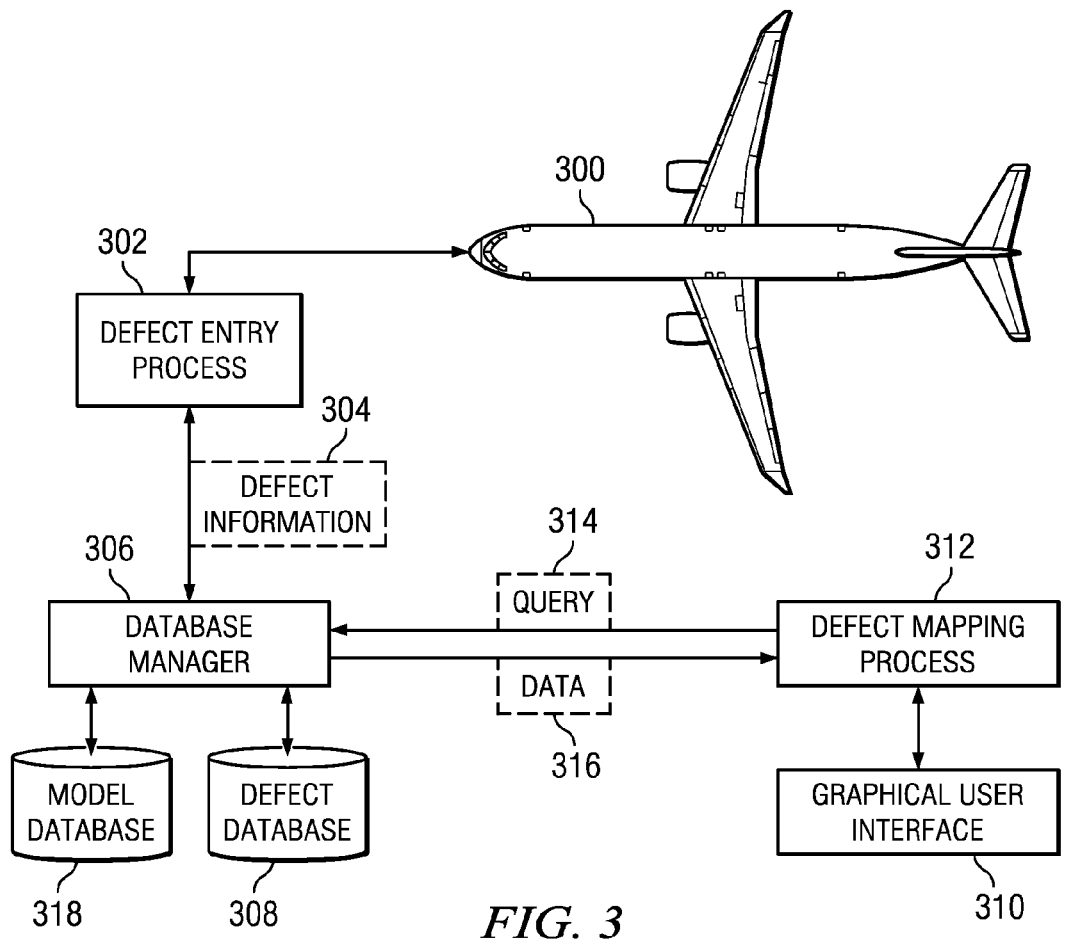
FIG. 3 is a diagram illustrating components used in providing three dimensional defect mapping in accordance with an advantageous embodiment of the present invention.

Turning now to FIG. 3, a diagram illustrating components used in providing three dimensional defect mapping is depicted in accordance with an advantageous embodiment of the present invention. In the illustrative examples, aircraft 300 is an example of a system that may be inspected. Based on an inspection of aircraft 300, various defects may be identified within aircraft 300.

These defects may be stored for later review using defect entry process 302. Defect entry process 302 sends defect information 304 to database manager 306. In response to receiving defect information 304, database manager 306 stores this information in defect database 308.

In these illustrative examples, defect information 304 contains an identification of the defect, as well as the location of the defect. The identification of the defect may include a unique identifier as well as information described in the defect that has occurred. For example, the information may include a description stating that a hole created for fasteners in aircraft 300 is larger than the size specified for the fastener.

Defect entry process 302 may be implemented as a software component client, such as client 110. Database manager 306 also is in a software component and may be, for example, located on a data processing system, such as server 104 in FIG. 1.

A user may then view a three dimensional display of the defects on graphical user interface 310 using defect mapping process 312. For example, a user may wish to view certain defects for aircraft 300. The defects may be, for example, a particular type or types of defects, defects that were found during a selected time period, or defects in a certain location or area on or in aircraft 300. The user also may view a comparison of the quantity or location of defects occurring in one vehicle relative to another vehicle in production.

To view these defects in these illustrative examples, the user generates query 314 at defect mapping process 312. Query 314 is received by database manager 306. In response to receiving query 314, database manager 306 identifies defects in defect database 308 that match the query. For example, database manager 306 may identify entries containing defects for a bay within aircraft 300. This information is returned in data 316 to defect mapping process 312.

Additionally, defect mapping process 312 also may include a request for a three dimensional model associated with the defects within query 314 or in a separate query. In these examples, database manager 306 identifies the three dimensional model corresponding to the defects and model database 318 returns that information as part of data 316 to defect mapping process 312.

In these illustrative examples, model database 318 contains models of the different systems. In these examples, the models included are three dimensional models of the systems of interest. A system may be, for example, an entire model of aircraft 300. Alternatively, the three dimensional model of the system may be for a particular subsystem or assembly within aircraft 300 if models for aircraft 300 are partitioned or stored based on systems and subsystems.

Depending of the particular implementation, database manager 306 may identify the three dimensional models needed based on the query for defects received in query 314. Alternatively, defect mapping process 312 may request a three dimensional model in a separate query. With data 316 defect mapping process 312 maps the defects to the model and presents the three dimensional mapping of the defects on graphical user interface 310 for viewing by a user. This mapping of defects to a three dimensional model of aircraft 300 may be implemented in a number of different ways.

For example, a three dimensional model of the defects, separate from the three dimensional model of the system, may be made. This three dimensional model of the defects is then overlaid or combined with the three dimensional model of the system to form a combined or final model for presentation. Alternatively, the three dimensional model of the system may be modified to include the defects. Of course, this modification in the model is only for viewing purposes and does not change the three dimensional model of the system stored in model database 318 in these examples.

In these examples, defect mapping process 312 may be implemented as part of a computer aided design software program or application. Alternatively, defect mapping process 312 may be implemented as a separate software process for viewing a three dimensional representation of defects in a system. If implemented as part of a computer aided design tool, defect mapping process 312 may be implemented in an actual computer aided design tool, such as Catia, which is a solution for digital product definitions and simulation by Dassault Systemes, NX which is a solution for digital product definition by UGS Corporation and ProENGINEER which is a solution for digital product definition by Parametric Technology Corporation.

Of course, programs using less resources may be employed, such as visualization tools. Other examples are the TeamCenter Visualization products from UGS Corporation, Digital Mockup (DMU) applications from Dassault Systemes, or Adobe Acrobat 3D from Adobe Systems Incorporated. In these illustrative examples, the presentation of the defects in a three dimensional model is presented using defect identifiers. These defect identifiers are graphical indicators placed in positions where the defects are located within the three dimensional of the system.

The illustration of the different functional components in FIG. 3 is not meant to imply architectural limitations to the manner in which the different components may be implemented. For example, defect database 308 may be a single database in one location. Alternatively, defect database 308 may represent multiple databases in different locations that are accessible by database manager 306. In a similar fashion, defect entry process 302 and defect mapping process 312 may be located on the same physical computer or on different computers in different locations.

Also, the defects stored in database 308 may be used to generate reports. These reports may, for example, identify the quantity and location of the most frequent types of nonconformance within one year of production. Another type of report may be the quantity and location of a particular type of defect per aircraft model.

Figure 4:
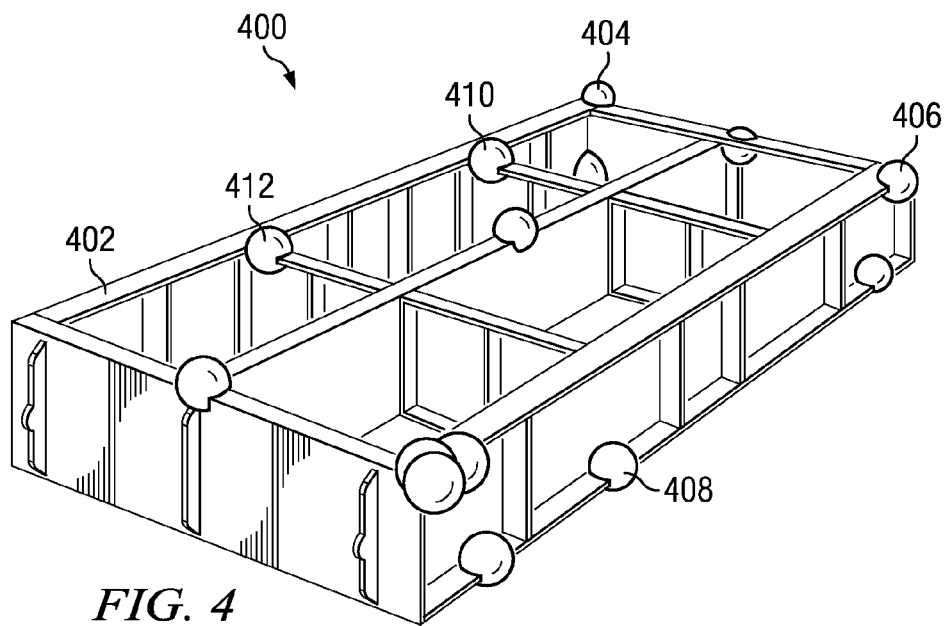
FIG. 4 is a diagram illustrating three dimensional mapping of defects presented in a graphical user interface in accordance with an advantageous embodiment of the present invention.

Turning now to FIG. 4, a diagram illustrating three dimensional mapping of defects presented in a graphical user interface is depicted in accordance with an advantageous embodiment of the present invention. In this example, display 400 is an example of a display that may be presented using a graphical user interface, such as graphical user interface 310 in FIG. 3. Subassembly 402 is presented in three dimensions along with defect identifiers, such as defect identifiers 404, 406, 408, 410, and 412. In these examples, the defect identifiers are presented as spheres with the center of the sphere being the location of the defect as tagged on the system when the defect was identified. These defect identifiers are graphical indicators used to indicate the presence of the defect within subassembly 402 in display 400.

Figure 5:
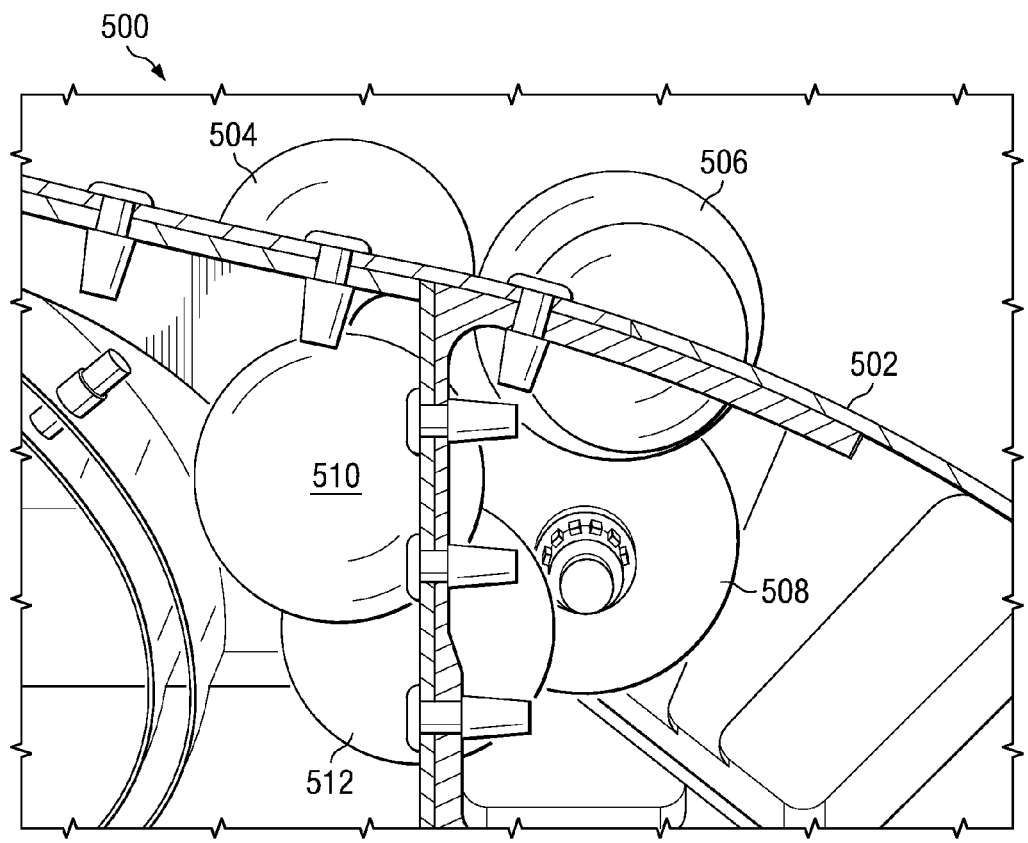
FIG. 5 is a diagram illustrating a three dimensional presentation of defects in accordance with an advantageous embodiment of the present invention.

Turning now to FIG. 5, a diagram illustrating a three dimensional presentation of defects is depicted in accordance with an advantageous embodiment of the present invention. In this example, display 500 is an example of a display that may be presented using graphical user interface 310 in FIG. 3. As illustrated, defects are presented for a particular section 502 in the three dimensional model of the vehicle. Defects identifiers 504, 506, 508, 510, and 512 are presented in display 500. These defect identifiers are displayed as spheres in which the defect is located at the center point of the sphere. Further, information may be displayed in association with the defect identifiers.

Figure 6:
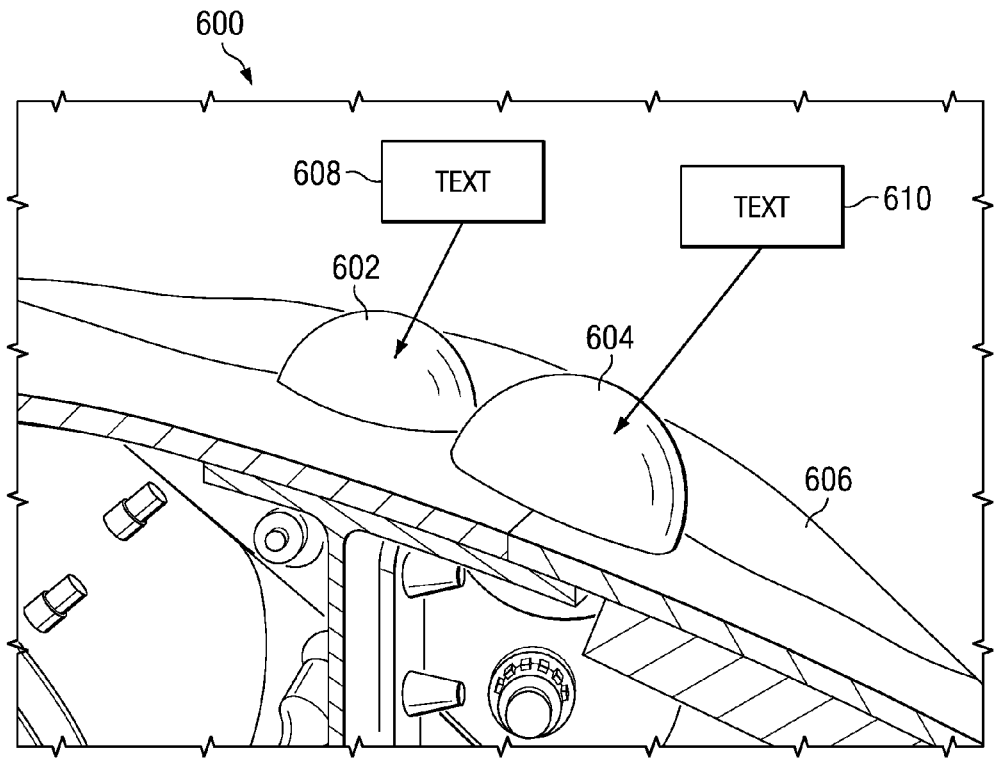
FIG. 6 is a diagram illustrating a presentation of defects in a three dimensional display in accordance with an advantageous embodiment of the present invention.

Turning now to FIG. 6, a diagram illustrating a presentation of defects in a three dimensional display is depicted in accordance with an advantageous embodiment of the present invention. Display 600 is another example of a display that may be presented by graphical user interface 310 in FIG. 3. In this example, defect identifiers 602 and 604 are displayed within assembly 606.

In addition to identifying the locations of the defects within this three dimensional presentation, flags 608 and 610 are associated with defect identifiers 602 and 604, respectively. In these examples, these flags provide information about the defects presented in assembly 606 using defect identifiers 602 and 604. This information may include, for example, text entered by the user identifying and describing the defect. For example, the information may state that an incorrect fastener was used to fasten two components in assembly 606. The information also may include when the defect was identified as well as the person identifying the defect.

In addition, links or universal resource locators may be associated with defect identifiers 602 and 604. These links also may be defined in flags 608 and 610. When links are defined with these types of graphical indicators, a selection of these links presents or retrieves additional information about the defects.

In these illustrative examples, defects may be displayed based on types of defects or based on particular locations. For example, nonconformances or defects in gap, mismatch, or clearance may be used to display only defects of that type within the graphical user interface. Additionally, a particular defect may be located based on its identifier and presented for viewing.

Figure 7:
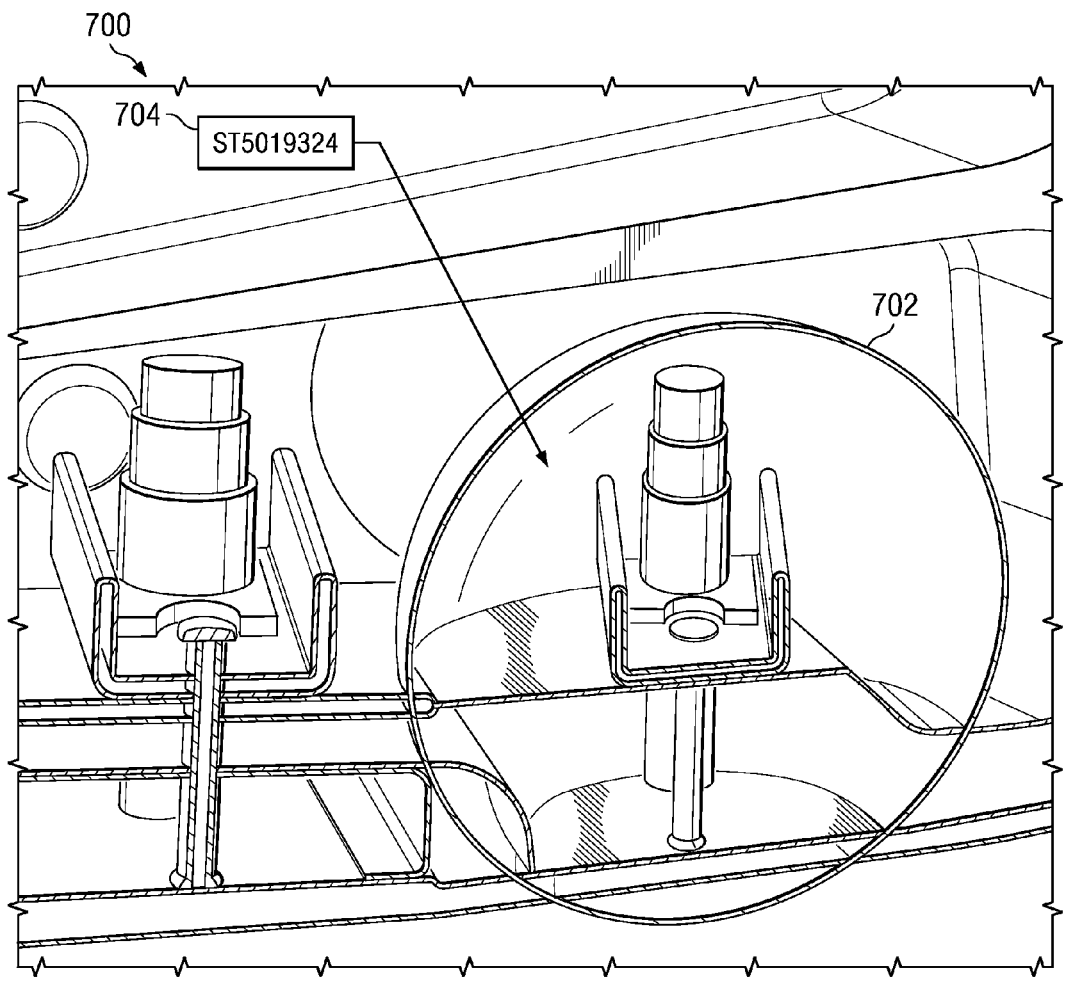
FIG. 7 is a diagram illustrating an identification of a defect in accordance with an advantageous embodiment of the present invention.

Turning now to FIG. 7, a diagram illustrating an identification of a defect is depicted in accordance with an advantageous embodiment of the present invention. Display 700 is an example of a display that may be presented using graphical user interface 310. In this particular example, defect identifier 702 indicates a defect having an identifier of ST5019324 as identified in flag 704. In this example, defect identifier 702 identifies an oversized flange. In these examples, after identifying the particular defect in the three dimensional model, the user also may generate a diagram or sketch to provide additional detail noting the discrepancy.

Figure 8:
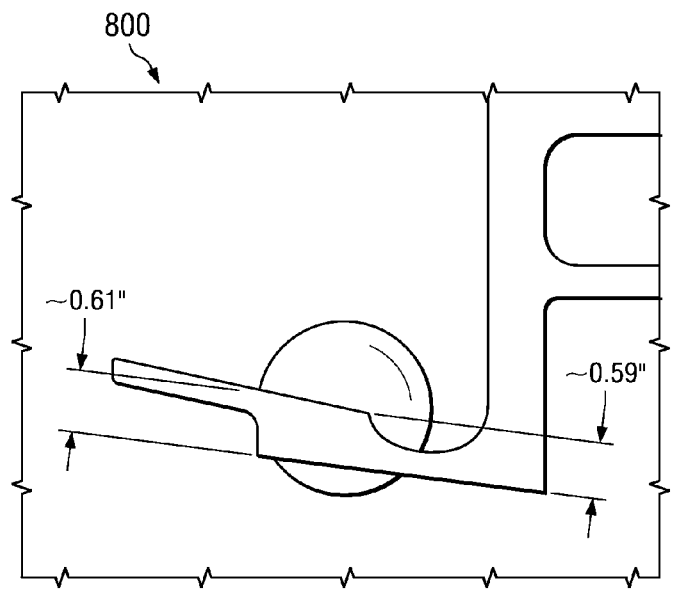
FIG. 8 is a diagram illustrating a two dimensional sketch of a defect in accordance with an advantageous embodiment of the present invention.

With reference to FIG. 8, a diagram illustrating a two dimensional sketch of a defect is depicted in accordance with an advantageous embodiment of the present invention. In this example, display 800 is an example of a two dimensional sketch that may be presented using graphical user interface 310 in FIG. 3. In this example, display 800 is for the oversized flange identified through defect identifier 702 in FIG. 7. The two dimensional sketch in display 100 may be provided to a supplier or team responsible for which the defect occurred.

Figure 9:
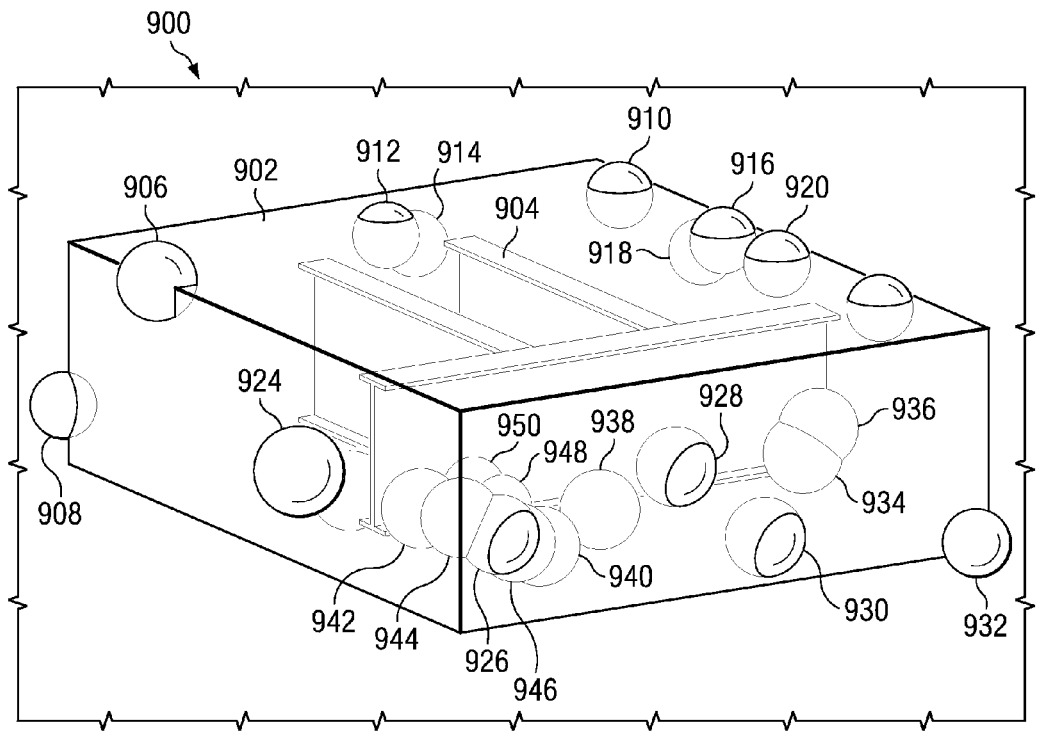
FIG. 9 is a diagram illustrating defects around a part using a volume filter in accordance with an advantageous embodiment of the present invention.

Turning now to FIG. 9, a diagram illustrating defects around a part using a volume filter is depicted in accordance with an advantageous embodiment of the present invention. Display 900 is another example of a display presented using graphical user interface 310 in FIG. 3. In this particular example, the user has selected a volume that is used to present defects that are encompassed within volume 902 by part 904. In this example, defects 906-950 are illustrated as being defects around a given part in which the defect identifiers intersect volume 902.

Figure 10:
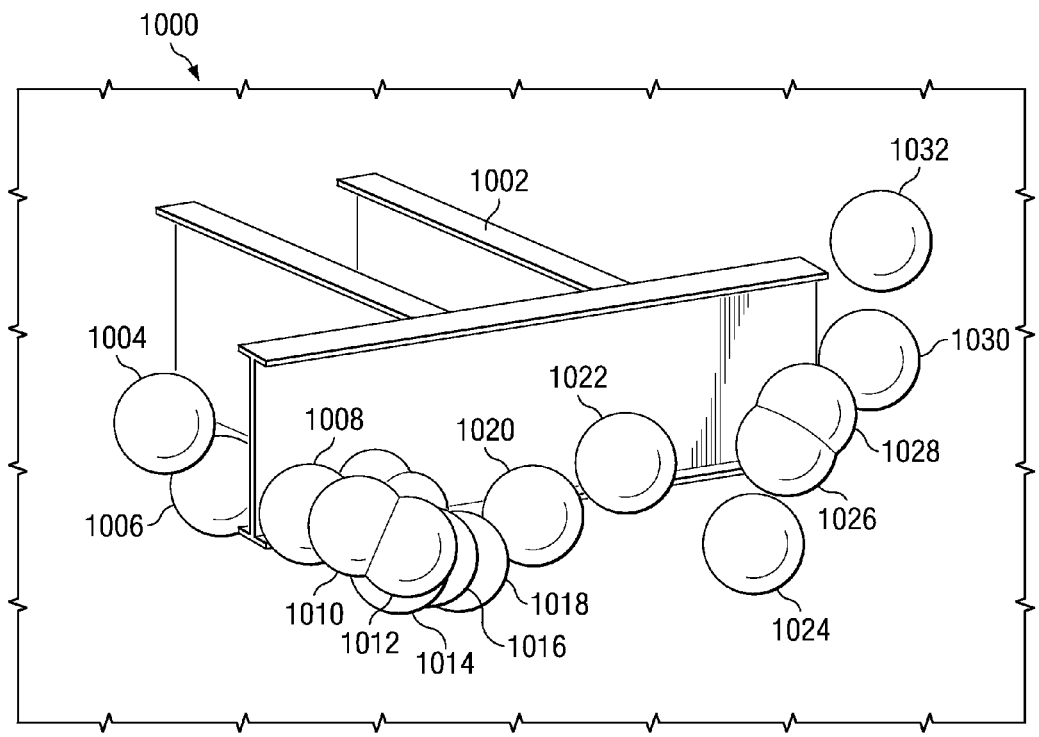
FIG. 10 is a display of defects located around a part in accordance with an advantageous embodiment of the present invention.

Turning next to FIG. 10, display 1000 is a display of defects located around a part in accordance with an advantageous embodiment of the present invention. In this example, display 1000 is an example of a display presented using graphical user interface 310. Part 1002 is depicted using a clearance filter to view defects around part 1002. In this example, defects 1004-1032 are illustrated. These diagrams illustrate some of the presentations of defects that may be generated using filters once a three dimensional representation of the defects is generated.

Figure 11:
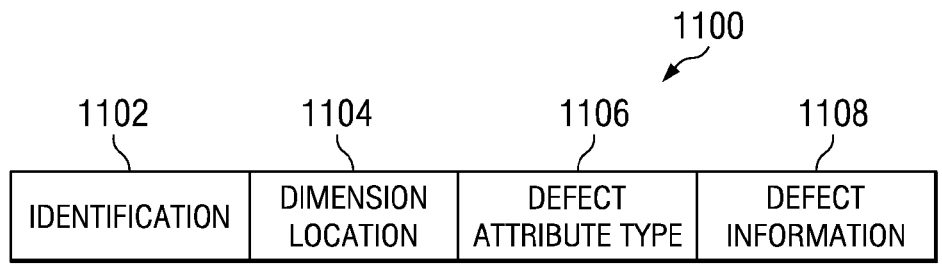
FIG. 11 is a diagram illustrating an entry in a defect database in accordance with an advantageous embodiment of the present invention.

Next in FIG. 11, a diagram illustrating an entry in a defect database is depicted in accordance with an advantageous embodiment of the present invention. Entry 1100 is an example of an entry that may be found in a defect database, such as defect database 308 in FIG. 3. In this example, entry 1100 contains identifier 1102, three dimensional location 1104, defect attribute type 1106 and defect information 1108 as fields containing attributes.

These different fields in entry 1100 represent parameters for a defect. These parameters are typically stored in a pair containing the name and value for the name. The value in these examples may be a numerical value. In other cases, text or links may be included as the value for the name of the attribute. Depending on the implementation, other attributes may be included in entry 1100 in addition to or in place of the depicted attributes.

In this particular illustrative example, identifier 1102 is typically a unique identifier that identifies the defect with respect to other defects in the particular system of interest, such as an aircraft or subassembly of an aircraft. Identifier 1102 may also include information to a particular three dimensional model of the particular system in which the defect is located. Depending on the particular implementation, identifier 1102 may be unique to the extent that the entry is unique for all entries in the defect database.

Location 1104 identifies the location of the defect in the part or system. This three dimensional location may be, for example, x, y, and z coordinates. Of course other location systems, such as spherical coordinates may be used depending on the particular implementation. In these examples, the coordinate system used for location 1104 is the same coordinate system of the model to which the defect may be associated.

Defect attribute type 1106 is an attribute that identifies an attribute for defect. This attribute, may be, for example, the type of defect. Examples of types of defects are gap, mismatch, clearance, incorrect hull size, burrs present, incorrect thickness, and raw material. Of course, other types of attributes for defects other than those in these illustrative embodiments may be used.

Another example of a type of attribute for defect attribute type 1106 is the status of the defect. For example, attribute 1106 may indicate that the defect is open, closed, or in-work. An open attribute means that the defect has not been processed on the aircraft. A closed attribute means that the defect has been processed and a resolution has been reached with respect to the defect. An in-work attribute value means that the defect is currently being looked at or worked on.

Defect information 1108 contains information about the defect. For example, if the thickness is incorrect, the defect information 1108 may identify the actual thickness as well as the expected or required thickness. Defect information 1108 also may include information about the time and date when the defect was identified, the person or team identifying the defect and other relevant information for the defect. As another example, other relevant information may be the severity of the defect or an identification of where additional information may be found for the defect. For example, defect information 1108 may contain a URL or link to additional or more detailed information regarding the defect in entry 1100.

Figure 12:
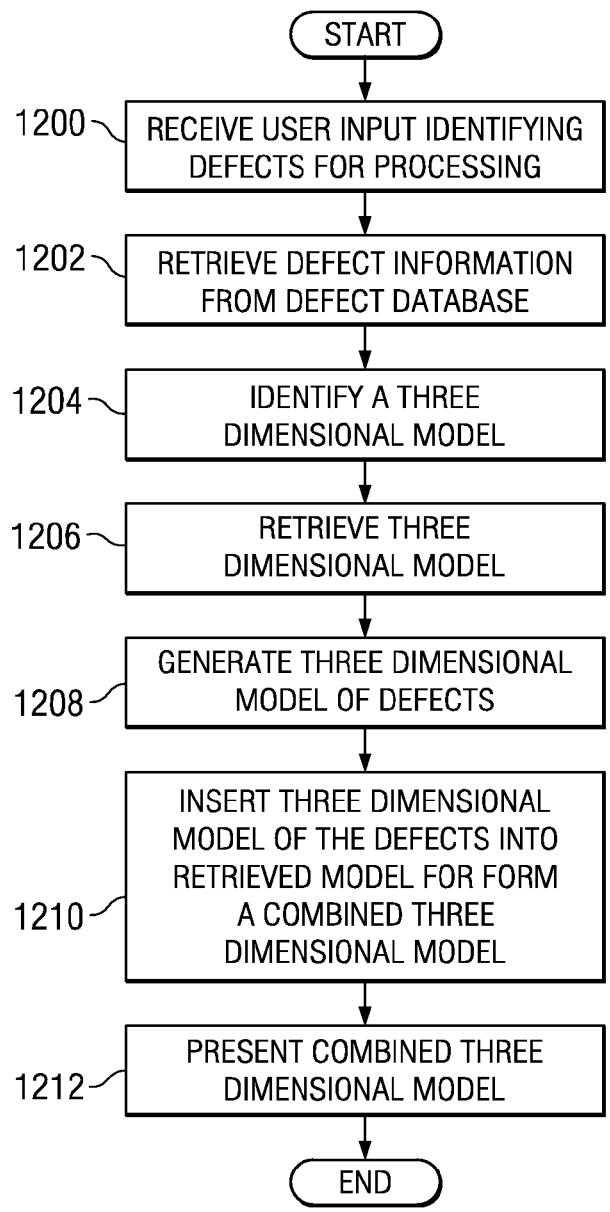
FIG. 12 is a flowchart of a process for three dimensional defect mapping in accordance with an advantageous embodiment of the present invention.

Turning now to FIG. 12, a flowchart of a process for three dimensional defect mapping is depicted in accordance with an advantageous embodiment of the present invention. The process illustrated in FIG. 12 may be implemented in a software component, such as defect mapping process 312 in FIG. 3.

The process begins by receiving user input identifying defects for processing (operation 1200). This user input may be, for example, a selection of an entire system, such as an aircraft. Alternatively, the user input also may take other forms, such as selecting a particular type of defect for an aircraft. The user input also may specify a particular subsystem in the aircraft for visualization. The user input also may be the selection of a particular defect in an aircraft.

The defect information is then retrieved from a defect database (operation 1202). Operation 1202 includes sending a query to a database manager for the defect database. The query may be, for example, a query for defects for a particular aircraft in a wing subassembly. In return, a reply containing data for a set of defects is received in operation 1202. The set of defects may be one or more defects depending on the user input and the results of the query.

Next, a three dimensional model needed is identified (operation 1204). The three dimensional model identified in operation 1202 is a three dimensional model of the system in which the defects are to be presented. The model may be identified through user input. Alternatively, the defects returned in operation 1202 may be used to identify the model that is needed. Thereafter, the three dimensional model is retrieved (operation 1206). Operation 1206 may involve sending a query to a database manager to retrieve the three dimensional model needed to map the defects in three dimensions. This three dimensional model may be, for example, a model of an entire aircraft, a part of an aircraft, or a particular sub-system in an aircraft. The three dimensional model is needed to map the defects in a format that is specified by a computer aided design program or application in these examples. This format may be, for example, the file format and the location system used by the program or application. A three dimensional model is generated for the defects (operation 1208). In these examples, the model is generated using the location information. In these examples, the three dimensional model generated in operation 1208 uses the same format as the three dimensional model in operation 1206.

Next, the three dimensional model of the defects is inserted into the retrieved three dimensional model to form a combined three dimensional model (operation 1210). The combined three dimensional model is then presented (operation 1212) with the process terminating thereafter.

The generation of the three dimensional presentation of defects may be implemented in other ways other than that illustrated in the example in FIG. 12. For example, the three dimensional model of the system may be modified to include the defects without generating a separate three dimensional model of the defects.

Figure 13:
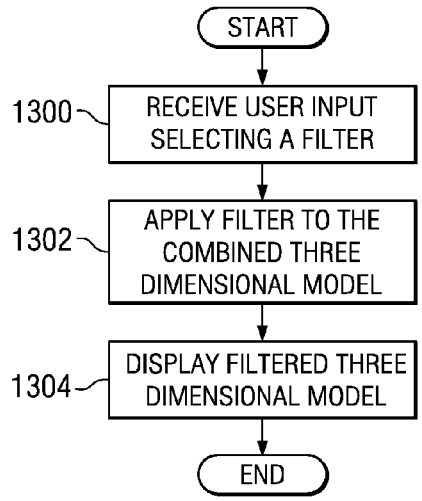
FIG. 13 is a flowchart of a process for manipulating a presentation of defects in accordance with an advantageous embodiment of the present invention.

Turning now to FIG. 13, a flowchart of a process for manipulating a presentation of defects is depicted in accordance with an advantageous embodiment of the present invention. The process illustrated in FIG. 13 may be implemented in a software component, such as defect mapping process 312 in FIG. 3.

The process begins by receiving user input, selecting a filter (operation 1300). This filter may be, for example, a volume filter in which the user input defines a volume in the model. Another type of filter may be, for example, a selection of a type of defect. Alternatively, a combination of filters may be designated by the user in operation 1300. The selected filter is then applied to the combined three dimensional model (operation 1302). The results are then displayed as a filtered three dimensional model (operation 1304).

Figure 14:
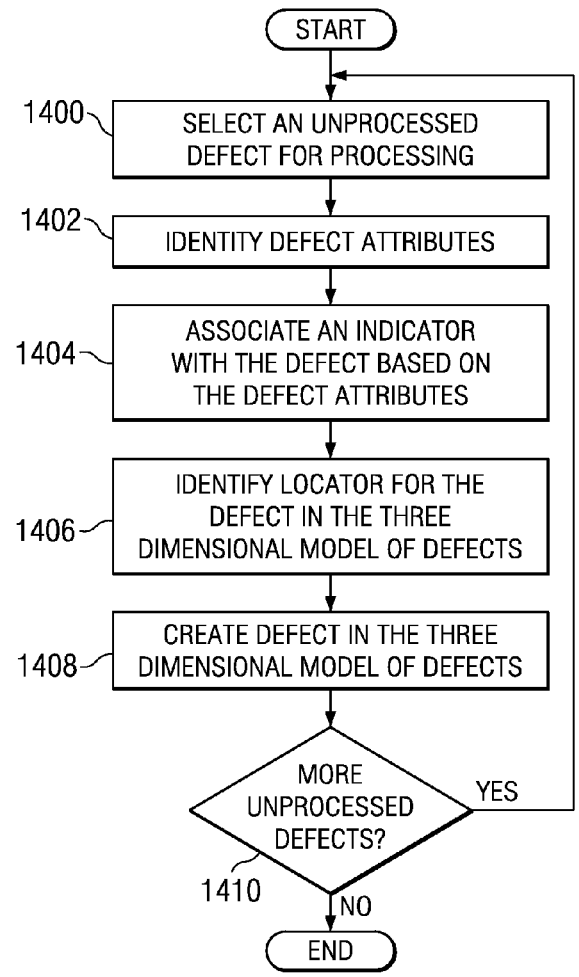
FIG. 14 is a flowchart of a process for creating a model of defects in accordance with an advantageous embodiment of the present invention.

Turning now to FIG. 14, a flowchart of a process for creating a model of defects is depicted in accordance with an advantageous embodiment of the present invention. The process illustrated in FIG. 14 is a more detailed illustration of operation 1208 in FIG. 12.

The process begins by selecting an unprocessed defect for processing (operation 1400). Operation 1400 selects a defect for processing from a set of defects. The set of defects is a set of one or more defects in these examples. The defect attribute type is identified (operation 1402). In these examples, the defect attribute type may be identified from information, such as defect attribute type 1106 in entry 1100 in FIG. 11.

Thereafter, an indicator is associated with the defect based on the value for the type of defect attribute (operation 1404). This indicator may take various forms depending on the particular implementation. For example, if defect indicators are in the form of spheres, a defect of a particular value for the attribute may be displayed in one color, while a defect of another value for the attribute may be displayed in a different color.

As an example, if the defect attribute type is for a status of the defect, the spheres for the defect may be color coded based on the status. For example, red is used for open, green is used for closed, and yellow is used for work with this type of attribute for the defect.

Alternatively, different shapes for the defect indicators could be used to identify the defect types. For example, spheres may be used for one value of an attribute for the type of defect, while a pyramid or cube is used for another value for the attribute. Of course, the defect indicator may take other forms, such as a cylinder. The indicator associated with the defect also may be, for example, text or a tag that is associated with the defect indicator.

Afterwards, the location for the defect is identified in the model of defects (operation 1406). This location is identified using three dimensional location information, such as three dimensional location 1104 in FIG. 11. This location information may take different forms depending on the particular implementation. For example, spherical coordinates or x, y, and z coordinates may be used in these particular examples. Then, the defect is created or placed in the three dimensional model of defects using the type of indicator and the location of the defect (operation 1408).

Next, a determination is made as to whether additional unprocessed defects are present (operation 1410). If additional defects are present, the process returns to operation 1400 to select another unprocessed defect for processing. Otherwise, the model of defects is complete and the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments of the present invention provide a computer implemented method, apparatus, and computer usable program code to present defects in a system using a three dimensional presentation. Parameters defining a defect are loaded from a database. The parameters include a location of the defect in the system. The defect is displayed in the location within a three dimensional presentation of the system.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing a three dimensional presentation of defects in a system, the computer implemented method comprising:
    responsive to a request to present a set of defects using a three dimensional presentation, retrieving information for the set of defects from a database, wherein the information includes an identification of a defect and a location of the defect in the system;
    retrieving a three dimensional model of the system in which the set of defects is located;
    generating a three dimensional model of the set of defects using the identification and the location of each defect in the set of defects, wherein the three dimensional model of the set of defects comprises a three dimensional defect indicator that represents a defect in the set of defects at the location of the defect in the system;
    combining the three dimensional model of the set of defects with the three dimensional model of the system to form a modified three dimensional model;
    presenting the modified three dimensional model on a graphical user interface; and
    presenting a two-dimensional diagram associated with the three dimensional defect indicator comprising an example of the defect.

2. The computer implemented method of claim 1, wherein the information further comprises at least one of a defect number, a defect incidence, a defect status, a description of the defect, and a defect location.

3. The computer implemented method of claim 1, wherein the location of the defect comprises one of x, y, and z coordinate values in a Cartesian coordinate system or values for a radial distance, zenith, and azimuth for a spherical coordinate system.

4. The computer implemented method of claim 1, wherein the step of presenting the two-dimensional diagram associated with the three dimensional defect indicator comprising the example of the defect is performed responsive to receiving a user input activating the three dimensional defect indicator, and wherein the two-dimensional diagram is presented within the three dimensional defect indicator.

5. The computer implemented method of claim 4, wherein the generating step further comprises:
    associating information about a particular defect in the set of defects with an associated defect indicator for particular defect.

6. The computer implemented method of claim 4, wherein the defect indicators are spheres and the diagram is presented at least partially within one of the spheres.

7. The computer implemented method of claim 6, wherein the spheres are color coded using the information for the set of defects.

8. The computer implemented method of claim 7, wherein the information used to color code the spheres is a defect status, wherein the defect status is selected from open, closed, or in-work.

9. The computer implemented method of claim 5, wherein the information associated with the associated defect indicator are attributes of the particular defect.

10. The computer implemented method of claim 5, wherein the information about the particular defect is a link to additional information about the particular defect.

11. The computer implemented method of claim 1, further comprising:
    generating a report of most frequently occurring locations for the set of defects.

12. The computer implemented method of claim 1, wherein the system is selected from one of an aircraft, a vehicle, a ship, a wing assembly, an engine, a bulkhead, and a wheel.

13. The computer implemented method of claim 1, further comprising:
    receiving a number of coordinates that form a three-dimensional polygon in the three dimensional model of the system; and
    wherein the step of generating the three dimensional model of the set of defects using the identification and the location of each defect in the set of defects comprises generating the three dimensional defect indicator for the defect when the location of the defect in the system is located in a volume within the polygon in the modified three dimensional model.

14. The computer implemented method of claim 1, further comprising:
    receiving an identifier for a part in the system and a distance around the part in the three dimensional model of the system; and
    wherein the step of generating the three dimensional model of the set of defects using the identification and the location of each defect in the set of defects comprises generating the three dimensional defect indicator for the defect when the location of the defect in the system is located within the distance around the part in the three dimensional model of the system.

15. A computer implemented method for providing a three dimensional presentation of defects in a system, the computer implemented method comprising:
    loading parameters defining a defect from a database, wherein the parameters include a location of the defect in the system;
    generating a three dimensional model of the defect using the location of the defect, wherein the three dimensional model of the defect comprises a three dimensional defect indicator that represents a defect in the set of defects at the location of the defect in the system;
    combining the three dimensional model of the set of defects with the three dimensional model of the system to form a combined three dimensional model;
    displaying the combined three dimensional model; and
    displaying a two-dimensional diagram associated with the three dimensional defect indicator comprising an example of the defect.

16. The computer implemented method of claim 15, wherein the step of displaying the two-dimensional diagram associated with the three dimensional defect indicator comprising the example of the defect is performed responsive to receiving a user input activating the three dimensional defect indicator, and wherein the two-dimensional diagram is presented within the three dimensional defect indicator.

17. A computer usable code product stored in a memory coupled to a processor, the computer usable code product comprising:
    a computer usable code receivable from the memory to execute on the processor to represent a three dimensional presentation of defects in a system, the computer usable code comprising:

computer usable code stored in the memory operative on the processor to, responsive to a request to present a set of defects using a three dimensional presentation, retrieve information for the set of defects from a database, wherein the information includes an identification of a defect and a location of the defect in the system;

computer usable code stored in the memory operative on the processor to retrieve a three dimensional model of the system in which the defects are located;

computer usable code stored in the memory operative on the processor to generate a three dimensional model of the set of defects using the identification and the location of each defect in the set of defects, wherein the three dimensional model of the set of defects comprises a three dimensional defect indicator that represents a defect in the set of defects at the location of the defect in the system;

computer usable code stored in the memory operative on the processor to combine the three dimensional model of the set of defects with the three dimensional model of the system to form a modified three dimensional model;

computer usable code stored in the memory operative on the processor to present the modified three dimensional model on a graphical user interface; and computer usable code stored in the memory operative on the processor to present a two-dimensional diagram associated with the three dimensional defect indicator comprising an example of the defect.

18. The computer usable code product of claim 17, wherein the information further comprises at least one of a defect number, a defect incidence, a defect status, a description of the defect, and a defect location.

19. The computer usable code product of claim 17, wherein the location of the defect comprises one of x, y, and z coordinate values in a Cartesian coordinate system or values for a radial distance, zenith, and azimuth for a spherical coordinate system.

20. The computer usable code product of claim 17, wherein the computer usable code stored in the memory operative on the processor to present the two-dimensional diagram associated with the three dimensional defect indicator comprising the example of the defect is operative on the processor when a user input is received activating the three dimensional defect indicator, and wherein the two-dimensional diagram is presented within the three dimensional defect indicator.

* * * * *